US008547584B2

(12) United States Patent
Sato

(10) Patent No.: US 8,547,584 B2
(45) Date of Patent: Oct. 1, 2013

(54) INFORMATION PROCESSING APPARATUS, IMAGE FORMING SYSTEM, IMAGE FORMING METHOD, AND MEDIUM STORING PROGRAM THEREOF, FOR TRANSFERRING A FILE WHENEVER A FIRST DESTINATION CANNOT BE ACCESSED

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 12/579,492

(22) Filed: Oct. 15, 2009

(65) Prior Publication Data
US 2010/0097645 A1 Apr. 22, 2010

(30) Foreign Application Priority Data
Oct. 22, 2008 (JP) .................................. 2008-272351

(51) Int. Cl.
*G06F 3/12* (2006.01)
(52) U.S. Cl.
USPC ............ 358/1.16; 358/1.15; 399/81; 709/239
(58) Field of Classification Search
USPC .................. 358/1.15, 1.16; 399/81; 709/239
See application file for complete search history.

(56) References Cited

U.S. PATENT DOCUMENTS

| 6,931,432 | B1 * | 8/2005 | Yoshida ......................... 709/206 |
| 7,265,859 | B2 | 9/2007 | Sato .............................. 358/1.15 |
| 7,522,302 | B2 | 4/2009 | Sato .............................. 358/1.15 |
| 7,603,685 | B2 * | 10/2009 | Knudson et al. ................. 725/46 |
| 2005/0063003 | A1 * | 3/2005 | Mishima et al. ............. 358/1.15 |
| 2006/0221407 | A1 | 10/2006 | Uchida et al. ................. 358/448 |
| 2009/0002763 | A1 * | 1/2009 | Sato ............................. 358/1.16 |

FOREIGN PATENT DOCUMENTS

| JP | A 2005-094444 | 4/2005 |
| JP | A 2006-287389 | 10/2006 |

* cited by examiner

*Primary Examiner* — Peter K Huntsinger
(74) *Attorney, Agent, or Firm* — Fitzpatrick, Cella, Harper & Scinto

(57) ABSTRACT

An information processing apparatus searches for an apparatus that has a transmission destination that can be accessed from an image forming apparatus on a network when a transmission destination of file transmission processing cannot be accessed from the image forming apparatus, generates a process flow including processing in which the image forming apparatus transmits a file to the transmission destination in the apparatus found through the search and transmits the generated process flow to the image forming apparatus, and generates a process flow including processing for moving the file from the transmission destination in the apparatus found through the search to a designated transmission destination and stores the generated process flow in the information processing apparatus. The information processing apparatus executes the generated process flow when the end of the processing is notified from the image forming apparatus.

7 Claims, 14 Drawing Sheets

F I G. 2
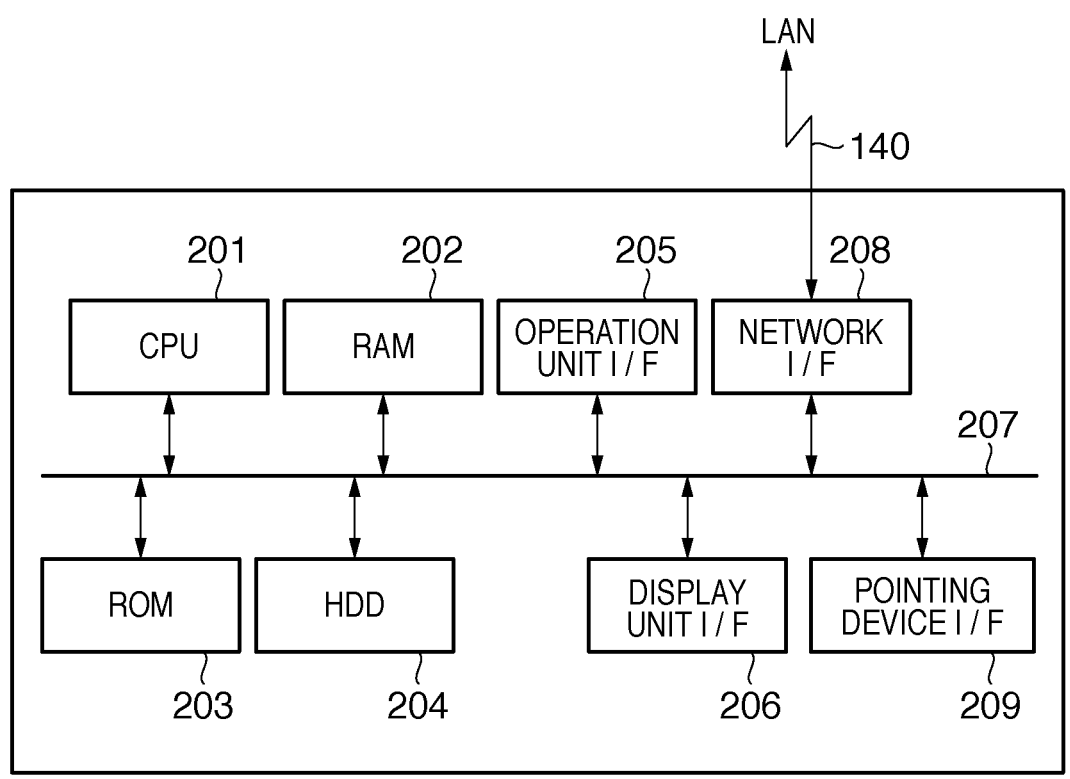

FIG. 7

```
PROCESS FLOW FILE : 700
<?xml version = "1.0" encoding = "utf-8" ?>
  <Taskflow id = "1" caption = "SEND TO FOLDER 606'>  ~701
            ~702       ~703
  <Task type = "Scan">  ~704
      <Setting> . . . . </Setting>  ~705
  </Task>
  <Task type = "Send">  ~706
      <Setting type = "FolderPath">  ~707
        11.11.11.11 ¥ PATH TO SHARED FOLDER 606
      </Setting>
      <Setting type = "FileName">  ~708
        PROCEEDINGS_20080321
      </Setting>
      <Setting> . . . . </Setting>
  </Task>
</Taskflow>
```

FIG. 9A

```
PROCESS FLOW FILE : 900                                              ~900
  <?xml version = "1.0" encoding = "utf-8" ?>
  <Taskflow id = "1" caption ="SEND TO FOLDER 606">
  <Task type = "Scan">
       <Setting> . . . . </Setting>
  </Task>
  <Task type = "Send">
       <Setting type = "FolderPath">  ~901
         44.44.44.44 ¥ PATH TO SHARED FOLDER
       </Setting>
       <Setting type = "FileName">  ~902
       ID_1
       </Setting>
       <Setting> . . . . </Setting>
  </Task>
</Taskflow>
```

FIG. 9B

```
PROCESS FLOW FILE : 950                                              ~950
  <?xml version = "1.0" encoding = "utf-8" ?>
  <Taskflow id = "1" caption = "SEND TO FOLDER 606">
  <Task type = "Move">  ~951
       <Setting type = "SourcePath">  ~952
         44.44.44.44 ¥ PATH TO SHARED FOLDER ¥ ID_1
       </Setting>
       <Setting type = "MovePath">  ~953
         PATH TO SHARED FOLDER 606
       </Setting>
        <Setting type = "ReName">  ~954
         PROCEEDINGS_20080321
       </Setting>
       <Setting> . . . . </Setting>
  </Task>
```

INFORMATION PROCESSING APPARATUS, IMAGE FORMING SYSTEM, IMAGE FORMING METHOD, AND MEDIUM STORING PROGRAM THEREOF, FOR TRANSFERRING A FILE WHENEVER A FIRST DESTINATION CANNOT BE ACCESSED

BACKGROUND OF THE INVENTION

1. Field of the Invention

The present invention relates to an image forming apparatus that generates a process flow by combining a plurality of tasks, an image forming system, an image forming method, and a medium storing a program thereof.

2. Description of the Related Art

Applications have been proposed with which a continuous process flow obtained by combining a plurality of tasks with respect to a document held in an image forming apparatus, such as an MFP (multifunction peripheral), can be registered and then executed by being called up by a user. Accordingly, a combination of processes that are frequently used can be executed without a troublesome operation.

Here, a task refers to, for example, a process that can be realized with the individual functions of an image forming apparatus or the like that is provided with multiple functions, or a process that can be realized with an application that is executed by an information processing apparatus or the like. For example, input and output tasks of the image forming apparatus include scanning originals, printing document data, transmission (e-mails, faxes, files, and the like), saving to a disk (saving to a hard disk internal or external to the image forming apparatus), and so on. Editing tasks include combining the data of a plurality of documents, deleting pages within document data, and so on.

A combination of a series of tasks that is created with the aim of linking together such a plurality of tasks and processing them chronologically is called a "process flow". Combining tasks in this way makes it possible to perform various combined processing, including inputting a result obtained with one task and executing another task with that input. There are image forming apparatuses in which an application handling the above process flow is installed, and the process flow is executed by the user pressing a button.

On the other hand, applications have been proposed with which a process flow can be created and registered in an image forming apparatus, using a keyboard or a mouse of an information processing apparatus, such as a PC (Personal Computer). Since a keyboard and a mouse are used, operability is superior compared to creating a process flow using a UI (user interface) such as a touch panel of an image forming apparatus.

However, when a process flow for transmission from an image forming apparatus to a folder designated by the user is created and registered, the folder designated by the user sometimes is not a shared folder. In such a case, a process flow according to which transmission to the folder designated by the user is impossible will be ultimately registered in the image forming apparatus. Further, if a folder designated by a user is inadvertently shared, then this folder may be easily attacked, thus creating a security problem, as well.

Various techniques have been developed in order to solve the above problems. Japanese Patent Laid-Open No. 2006-287389 describes an image forming apparatus in which only a shortcut is created to a folder designated by a user, and image data transmitted from the image forming apparatus is saved in another shared folder, thus enabling access to the image data from the folder designated by the user.

Japanese Patent Laid-Open No. 2005-094444 is a conventional example of avoiding the case where transmission to a folder designated by a user is impossible. In Japanese Patent Laid-Open No. 2005-094444, when image data cannot be transmitted to a transmission destination from an image forming apparatus, data is temporarily saved in a storage area of the image forming apparatus. An inquiry is regularly made to the transmission destination about whether transmission is possible, and data is transmitted when transmission is possible, thereby avoiding the case where transmission is impossible.

In Japanese Patent Laid-Open No. 2006-287389, since image data is not transmitted to a folder designated by a user, but saved in another shared folder, it is possible to maintain security of the folder designated by the user.

However, the image data is not transmitted to the folder designated by the user. Thus, in order to save the image data in the folder designated by the user, the user has to move the image data from the shared folder.

In Japanese Patent Laid-Open No. 2005-094444, since an inquiry is made to a transmission destination about whether transmission is possible or not, it is possible to transmit after transmission is allowed.

However, although this method is effective when the reason why transmission is impossible is power off or the like, the method cannot be applied when the transmission destination is not set so as to be shared.

SUMMARY OF THE INVENTION

The present invention provides an image forming system that can maintain security of a transmission destination designated by a user and increase the convenience for the user, even when the transmission destination designated by the user cannot be accessed from an image forming apparatus.

The present invention in its first aspect provides an image forming system to which an information processing apparatus and an image forming apparatus are connected via a network, wherein the information processing apparatus comprises:

a designation unit configured to designate a transmission destination of file transmission processing executed by the image forming apparatus;

a determination unit configured to determine whether or not the transmission destination of the file transmission processing can be accessed from the image forming apparatus;

a search unit configured to, when the result of the determination by the determination unit is that the transmission destination cannot be accessed from the image forming apparatus, search for an apparatus that has a transmission destination that the image forming apparatus can access on the network;

a first generation unit configured to generate a process flow including file transmission processing in which the image forming apparatus transmits a file to the transmission destination in the apparatus found through the search by the search unit, and transmit the generated process flow to the image forming apparatus; and a second generation unit configured to generate a process flow including processing for moving the file from the transmission destination in the apparatus found through the search by the search unit to the transmission destination designated by the designation unit, and store the generated process flow in the information processing apparatus, the image forming apparatus comprises:

an execution unit configured to execute the process flow transmitted from the information processing apparatus, and transmit the file to the transmission destination specified in the process flow; and a notification unit configured to notify, when the execution by the execution unit ends, the information processing apparatus of the end of the execution, and the information processing apparatus further comprises a moving unit configured to execute the process flow generated by the second generation unit when the end of the execution is notified by the notification unit, and move the file from the transmission destination in the apparatus found through the search by the search unit to the transmission destination designated by the designation unit.

The present invention in its second aspect provides an image forming method executed by an image forming system to which an information processing apparatus and an image forming apparatus are connected via a network, the image forming method comprising:

a designation step in which the information processing apparatus designates a transmission destination of file transmission processing executed by the image forming apparatus;

a determination step in which the information processing apparatus determines whether or not the transmission destination of the file transmission processing can be accessed from the image forming apparatus;

a search step in which when the result in the determination step is that the transmission destination cannot be accessed from the image forming apparatus, the information processing apparatus searches for an apparatus that has a transmission destination that the image forming apparatus can access on the network;

a first generation step in which the information processing apparatus generates a process flow including file transmission processing in which the image forming apparatus transmits a file to the transmission destination in the apparatus found through the search in the search step, and transmits the generated process flow to the image forming apparatus;

a second generation step in which the information processing apparatus generates a process flow including processing for moving the file from the transmission destination in the apparatus found through the search in the search step to the transmission destination designated in the designation step, and stores the generated process flow in the information processing apparatus;

an execution step in which the image forming apparatus executes the process flow transmitted from the information processing apparatus, and transmits the file to the transmission destination specified in the process flow;

a notification step in which the image forming apparatus notifies, when the execution in the execution step ends, the information processing apparatus of the end of the execution; and a moving step in which the information processing apparatus executes the process flow generated in the second generation step when the end of the execution is notified in the notification step, and moves the file from the transmission destination in the apparatus found through the search in the search step to the transmission destination designated in the designation step.

The present invention in its third aspect provides a computer-readable medium storing an image forming program, the image forming program being used in an information processing apparatus in an image forming system to which the information processing apparatus and an image forming apparatus are connected via a network, wherein the computer-readable medium causes a computer as the information processing apparatus to:

designate a transmission destination of file transmission processing executed by the image forming apparatus, determine whether or not the transmission destination of the file transmission processing can be accessed from the image forming apparatus, search for, when it is determined that the transmission destination cannot be accessed from the image forming apparatus, an apparatus that has a transmission destination that the image forming apparatus can access on the network, generate a process flow including file transmission processing in which the image forming apparatus transmits a file to the transmission destination in the apparatus found through the search, and transmits the generated process flow to the image forming apparatus, generate a process flow including processing for moving the file from the transmission destination in the apparatus found through the search to the designated transmission destination, and stores the generated process flow in the information processing apparatus, and execute the generated process flow when a notification indicating that the process flow has ended is received from the image forming apparatus, and move the file from the transmission destination in the apparatus found through the search to the designated transmission destination.

The present invention in its fourth aspect provides an information processing apparatus used in an image forming system to which the information processing apparatus and an image forming apparatus are connected via a network, the information processing apparatus comprising:

a designation unit configured to designate a transmission destination of file transmission processing executed by the image forming apparatus;

a determination unit configured to determine whether or not the transmission destination of the file transmission processing can be accessed from the image forming apparatus;

a search unit configured to, when the result of the determination by the determination unit is that the transmission destination cannot be accessed from the image forming apparatus, search for an apparatus that has a transmission destination that the image forming apparatus can access on the network;

a first generation unit configured to generate a process flow including file transmission processing in which the image forming apparatus transmits a file to the transmission destination in the apparatus found through the search by the search unit, and transmit the generated process flow to the image forming apparatus;

a second generation unit configured to generate a process flow including processing for moving the file from the transmission destination in the apparatus found through the search by the search unit to the transmission destination designated by the designation unit, and store the generated process flow in the information processing apparatus; and a moving unit configured to execute the process flow generated by the second generation unit when a notification indicating that the process flow has ended is received from the image forming apparatus, and move the file from the transmission destination in the apparatus found through the search by the search unit to the transmission destination designated by the designation unit.

According to the present invention, even when the transmission destination designated by the user cannot be accessed from the image forming apparatus, it is possible to maintain security of the transmission destination designated by the user and increase the convenience for the user.

Further features of the present invention will become apparent from the following description of exemplary embodiments with reference to the attached drawings.

BRIEF DESCRIPTION OF THE DRAWINGS

FIG. 2 is a diagram showing the hardware configuration of a PC that constitutes the image forming system in this embodiment.

FIG. 7 is a diagram showing a first example of a process flow file in this embodiment.

FIGS. 9A and 9B are diagrams showing second and third examples of process flow files in this embodiment.

DESCRIPTION OF THE EMBODIMENTS

Figure 1:
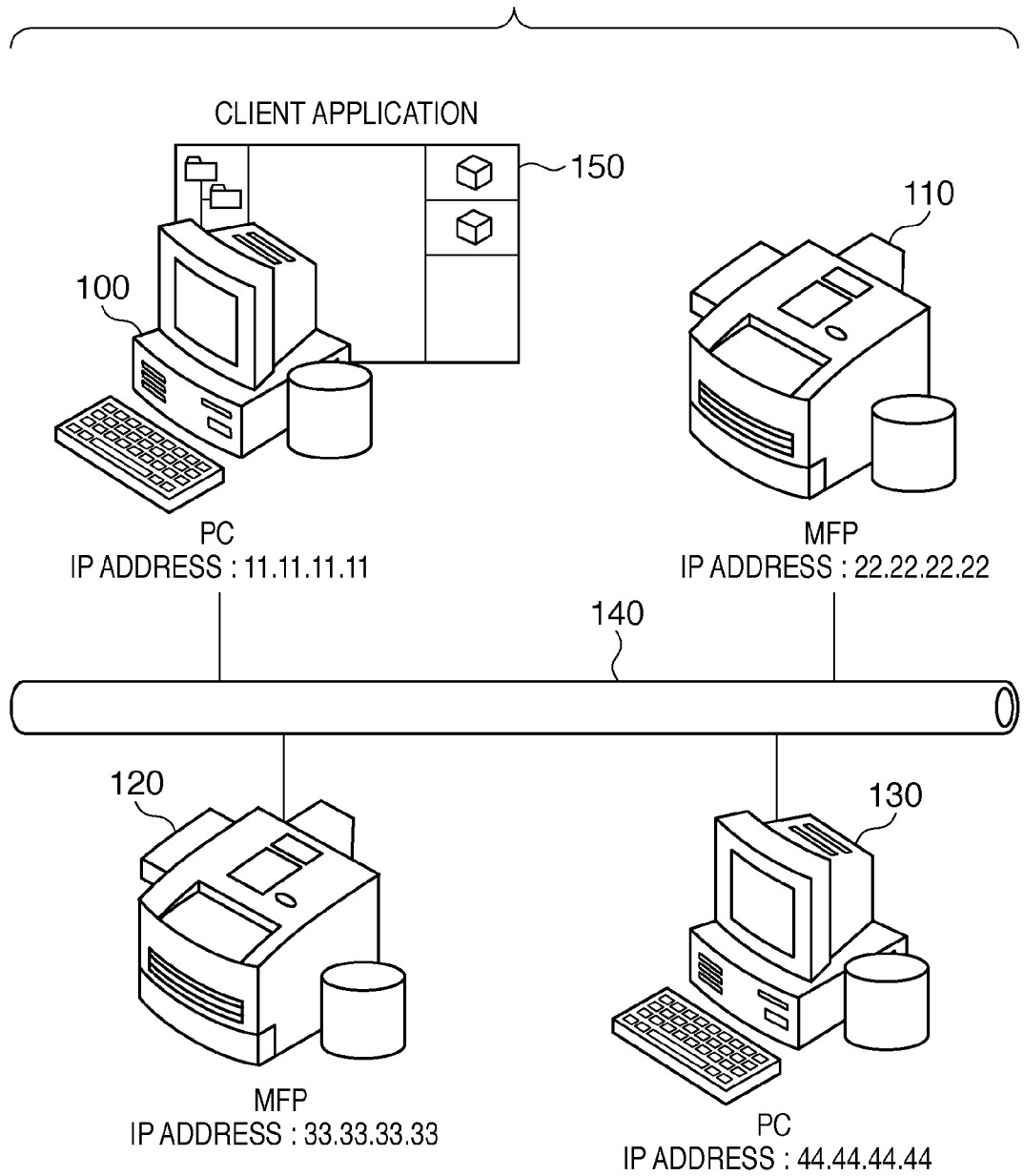
FIG. 1 is a diagram showing an example configuration of an image forming system in a first embodiment according to the present invention.

Hereinafter, preferred embodiments for implementing the present invention will be described in detail with reference to the drawings. It should be noted that like reference numerals are given to like constituent elements, and their further description is omitted.

First Embodiment

FIG. 1 is a diagram showing an example configuration of an image forming system in an embodiment according to the present invention. PCs 100 and 130, and MFPs 110 and 120 are connected to a LAN 140 serving as a network. A client application 150 exclusively used for the image forming system of the present invention is installed on the PC 100. Here, MFP is the abbreviation for "Multi Function Peripheral", and refers to a peripheral apparatus having multiple functions.

Let the IP addresses of the PC 100, the MFP 110, the MFP 120, and the PC 130 be "11.11.11.11.", "22.22.22.22", "33.33.33.33", and "44.44.44.44", respectively.

FIG. 2 is a diagram showing an example hardware configuration of a PC that constitutes the image forming system in this embodiment. A CPU 201, a RAM 202, a ROM 203, and a hard disk drive (HDD) 204 are arranged on a system bus 207. Furthermore, an operation unit interface (I/F) 205 connected to a keyboard or the like, a display unit I/F 206 connected to a CRT or the like, a network I/F 208, and a pointing device I/F 209 connected to a mouse or the like are also connected to the system bus 207.

Control programs and application programs have been previously stored in the ROM 203 or the HDD 204. The CPU 201 reads out a control program or an application program from the ROM 203 or the HDD 204 onto the RAM 202, and executes the program, as necessary.

The CPU 201 displays various pieces of information via the display unit I/F 206, and also receives instructions from a user via the operation unit I/F 205 or the pointing device I/F 209, and so on. Furthermore, the CPU 201 communicates with other devices on the LAN 140 via the network interface 208.

Figure 3:
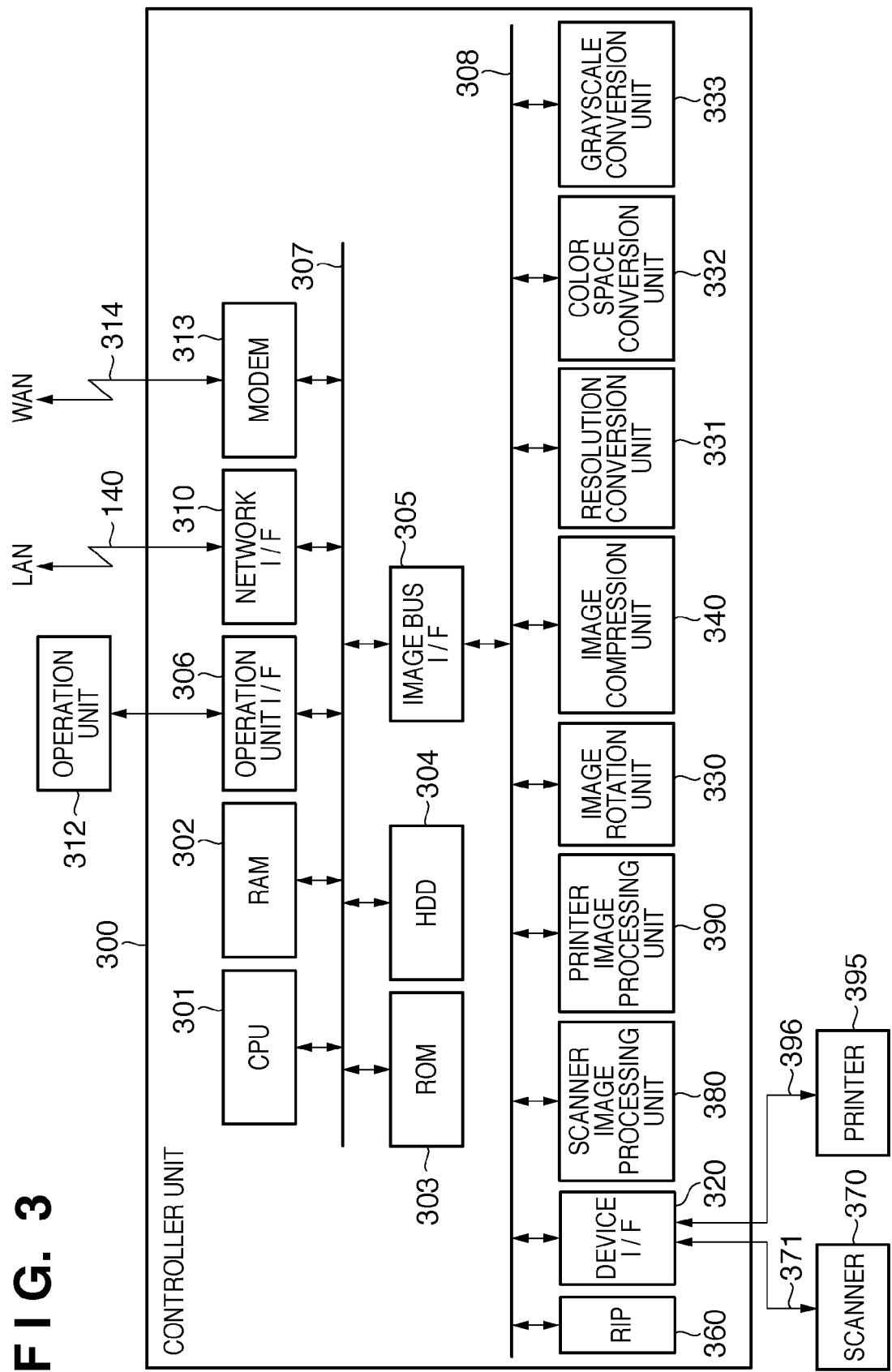
FIG. 3 is a block diagram showing the internal configuration of an MFP that constitutes the image forming system in this embodiment.

FIG. 3 is a block diagram illustrating the internal configuration of each MFP in this embodiment. A controller unit 300 is connected to a scanner 370 serving as an image input device, and a printer 395 serving as an image outputting device. Then, the controller unit 300 inputs/outputs image information or device information by connecting to the LAN 140 or a public network (WAN) 314.

A CPU 301 is a controller that controls the whole system. A RAM 302 is serving as a system work memory for the CPU 301 to operate, and also as an image memory for temporarily storing image data.

A ROM 303 serves as a boot ROM on which a boot program of the system is stored. An HDD 304 serves as a hard disk drive that stores image data and a software module. An operation unit I/F 306 serves as an interface with an operation unit (UI) 312, and outputs image data to be displayed on the operation unit 312 to the operation unit 312. A network interface 310 is connected to the LAN 140 so as to output and input information. A modem 313 is connected to the public network 314 so as to output and input image information.

The above devices are connected to a system bus 307. An image bus I/F 305 connects the system bus 307 to an image bus 308 that transfers image data at high speed, and is a bus bridge that converts data structures. The following devices are connected to the image bus 308.

A raster image processor (RIP) 360 develops PDL code into a bitmap image. A device I/F 320 connects the scanner 370 and printer 395 serving as image input/output devices, to the controller unit 300 via interfaces 371 and 396. A scanner image processing unit 380 corrects, processes, and edits input image data. Furthermore, the scanner image processing unit 380 has a function for determining whether the inputted image is a color original or a monochrome original from the chroma signal of the image, and holding the result.

A printer image processing unit 390 corrects, processes, and edits output image data. An image rotation unit 330, in cooperation with the scanner image processing unit, rotates an image at the same time as the image is scanned from the scanner and stores the rotated image in the memory, or rotates an image in the memory and stores the rotated image in the memory. Alternatively, the image rotation unit 330 can also print an image in the memory while rotating it, in cooperation with the printer image processing unit.

A resolution conversion unit 331 performs resolution conversion processing on an image in the memory, and stores the image in the memory. A color space conversion unit 332 converts, for example, a YUV image in the memory to a Lab image using a matrix operation, and stores the converted image in the memory. A grayscale conversion unit 333 converts, for example, an 8-bit (256 grayscale levels) image in the memory to 1-bit (2 grayscale levels) data using a method such as an error diffusion process, and stores the converted data in the memory. An image compression unit 340 performs compression and decompression processing using JPEG for multi-value image data and JBIG, MMR, MR, or MH for binary image data.

The image rotation unit 330, the resolution conversion unit 331, the color space conversion unit 332, the grayscale conversion unit 333, and the image compression unit 340 can operate in conjunction with one another. For example, in the case of performing image rotation and resolution conversion on an image in the memory, both processes can be executed without involving the memory.

Figure 4:
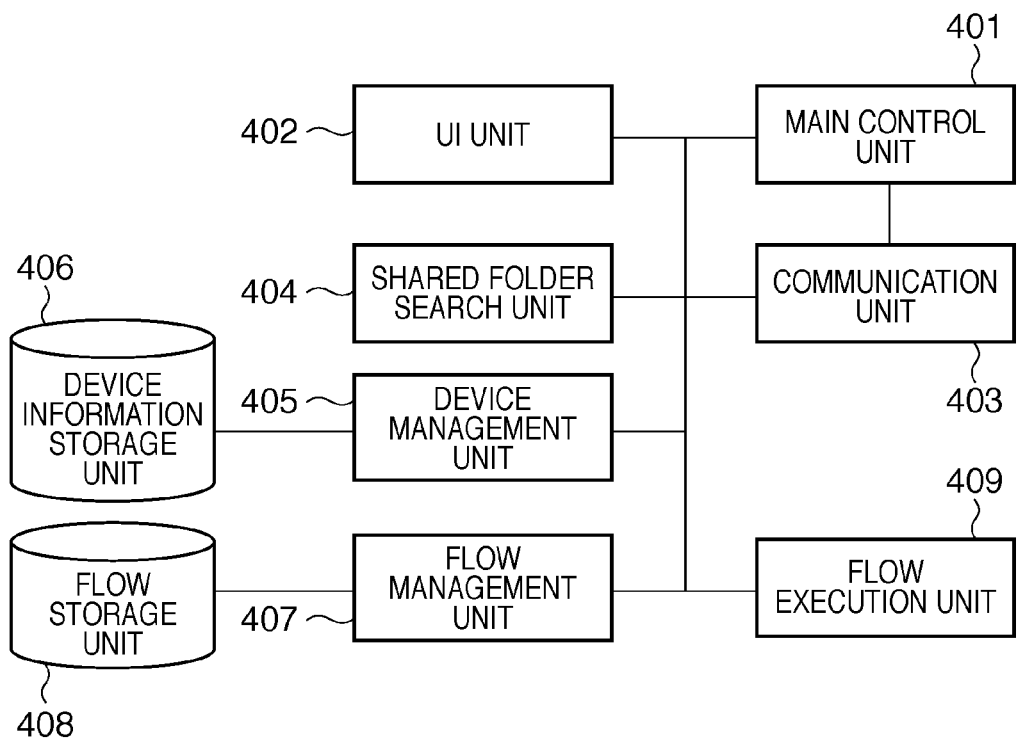
FIG. 4 is a diagram showing the software configuration of the PC that constitutes the image forming system in this embodiment.

FIG. 4 is a diagram showing the software configuration of the PC 100 in this embodiment. A main control unit 401 is a software module that controls the client application 150 of the image forming system in this embodiment, and issues instructions to and manages each unit described later.

A UI unit 402 is a software module that performs display for the client application 150 via the display unit interface 206 in response to instructions from the main control unit 401. Also, the UI unit 402 receives an operation from the user via a mouse, a keyboard, or the like, and, notifies the main control unit 401 of contents of the operation.

A communication unit 403 communicates with external apparatuses, such as an information processing apparatus or an MFP connected by the LAN 140 via the network interface 208, in response to instructions from the main control unit 401 or a shared folder search unit 404. Also, the communication unit 403 receives communication from an external apparatus connected by the LAN 140, and provides notification to the main control unit 401 and the shared folder search unit 404.

The shared folder search unit 404 is a software module that searches for a shared folder set so as to be accessible from each terminal connected to the network of the LAN 140, and notifies the main control unit 401 of the search result, in response to instructions from the main control unit 401.

A device management unit 405 is a software module that registers device information such as a communication destination such as an IP address and a host name, or an icon of an MFP in a device information storage unit 406. Further, the device management unit 405 reads out device information from the device information storage unit 406 in response to instructions from the main control unit 401 or the shared folder search unit 404.

A flow management unit 407 is a software module that registers a process flow described later in a flow storage unit 408. Further, the flow management unit 407 edits a process flow or passes a process flow to a flow execution unit 409, in response to instructions from the main control unit 401. The flow execution unit 409 is a software module that analyzes a process flow and executes processing indicated in the process flow, in response to instructions from the flow management unit 407.

Figure 5:
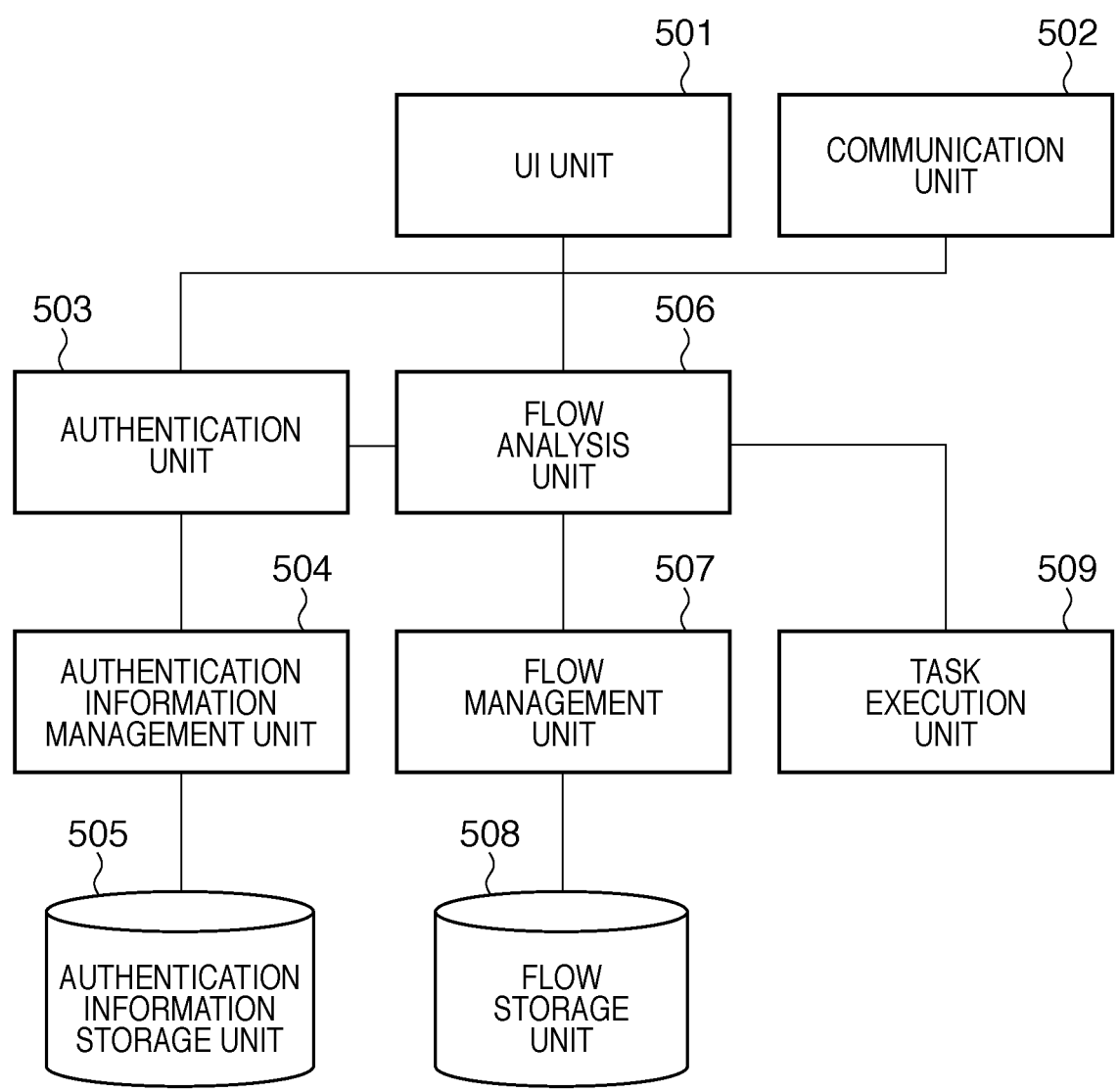
FIG. 5 is a diagram showing the software configuration of the MFP that constitutes the image forming system in this embodiment.

FIG. 5 is a diagram showing the software configuration of the MFP 110 in this embodiment. A UI unit 501 is a software module that displays on the operation unit 312 via the operation unit I/F 306, or processes user input from the operation unit 312. A communication unit 502 is a software module that communicates by operating the network interface 310 and the modem 313.

An authentication unit 503 is a software module that receives log-in information of a user who operated from the UI unit 501, and user information received from the communication unit, performs user authentication, and manages user sessions.

An authentication information management unit 504 is a software module that manages user authentication information registered in an authentication information storage unit 505, and responds to inquiries for authentication information from the authentication unit 503. Although the authentication information storage unit 505 is provided inside the MFP so as to hold authentication information in this embodiment, a configuration in which an authentication server (not shown) is separately provided to manage authentication information may be adopted.

A flow analysis unit 506 is a software module that analyzes a process flow. Also, the flow analysis unit 506 breaks process flows down into task settings in function units (for example, scan job settings, print job settings, transmission job settings).

A flow management unit 507 is a software module that registers a process flow in a flow storage unit 508 in response to instructions from the flow analysis unit 506. Further, the flow management unit 507 reads out a process flow from the flow storage unit 508 in response to instructions from the flow analysis unit 506. A task execution unit 509 is a software module for generating tasks based on setting information for various tasks and executing generated tasks.

Figure 6:
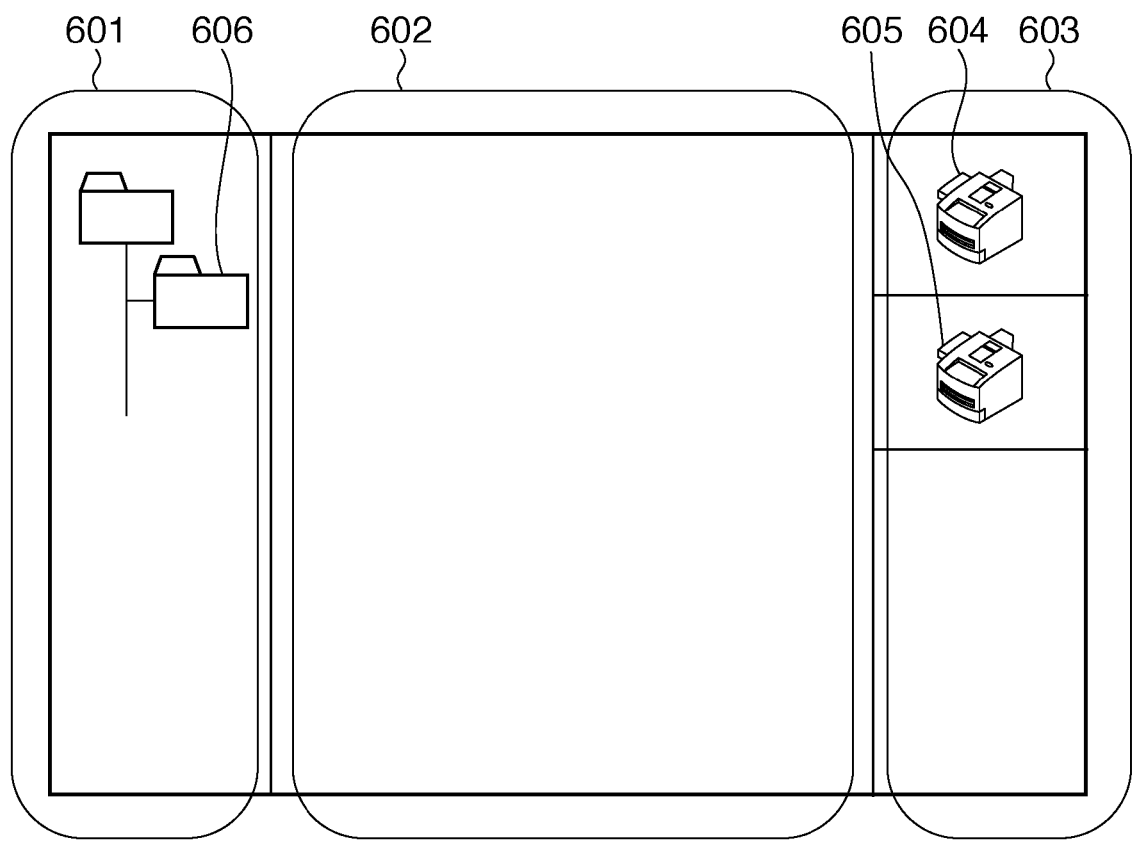
FIG. 6 is a diagram showing an example UI of a client application on the PC that constitutes the image forming system in this embodiment.

FIG. 6 is a diagram showing an example user interface (UI) of the client application 150 in this embodiment. The UI in FIG. 6 is displayed by the UI unit 402 via the display unit interface 206. A folder and a directory are displayed as a tree structure in a tree view area 601. In an editing area 602, detailed settings for tasks such as scanning and transmission are made so as to create a process flow.

In a device display area 603, icons of devices, such as an MFP and a scanner, are displayed. The devices displayed in the device display area 603 are registered in the client application 150, and the information thereon is stored in the device information storage unit 406. For example, the MFP 110 (604) and the MFP 120 (605) are registered in the client application 150 in FIG. 6.

By performing an operation of dragging and dropping an icon displayed in the device display area 603 to a folder in the tree view area 601, it is possible to register, in a device, a process flow for scanning and transmitting to that folder as a destination. Consequently, it is possible to set a transmission destination and perform an operation of registering a process flow to an MFP at the same time.

In this embodiment, although a transmission destination is set and an operation of registering a process flow in an MFP is performed by dragging and dropping, a transmission destination may be set in the editing area 602 by operating a keyboard or mouse so as to register in an MFP. By operating the UI of the client application 150 shown in FIG. 6, the user can create a process flow and register the created process flow in an MFP.

FIG. 7 is a diagram showing an example of a process flow file that defines a process flow in this embodiment. In this embodiment, the process flow file is an XML file. This process flow file includes transmission processing in which an image forming apparatus transmits image data to a transmission destination. Further, this process flow file is saved in the flow storage unit 408 in a PC, or the flow storage unit 508 of an MFP. The process flow file 700 shown in FIG. 7 is a process flow regarding image processing, and is saved in the flow storage unit 508.

Tasks included in a process flow are represented as XML tags, and the order in which the tasks appear is assumed to correspond to the processing order of the tasks. The detailed settings content regarding the tasks has, however, been omitted in FIG. 7. A tag 701 indicates that this process flow contains one task. An attribute 702 indicates an ID that uniquely identifies the process flow.

An attribute 703 indicates the name of the process flow. Such names are button names registered in an MFP. A tag 704 indicates that a scanning task using a scanner is to be executed so as to input an image.

A tag 705 indicates detailed settings for the scanning task. A tag 706 indicates that a transmission task (send task) is to be executed to transmit image data to a transmission destination. A tag 707 indicates a path to a folder that is a transmission destination in the transmission task settings. A tag 708 indicates a filename of image data to be transmitted in the transmission task settings.

Figure 8:
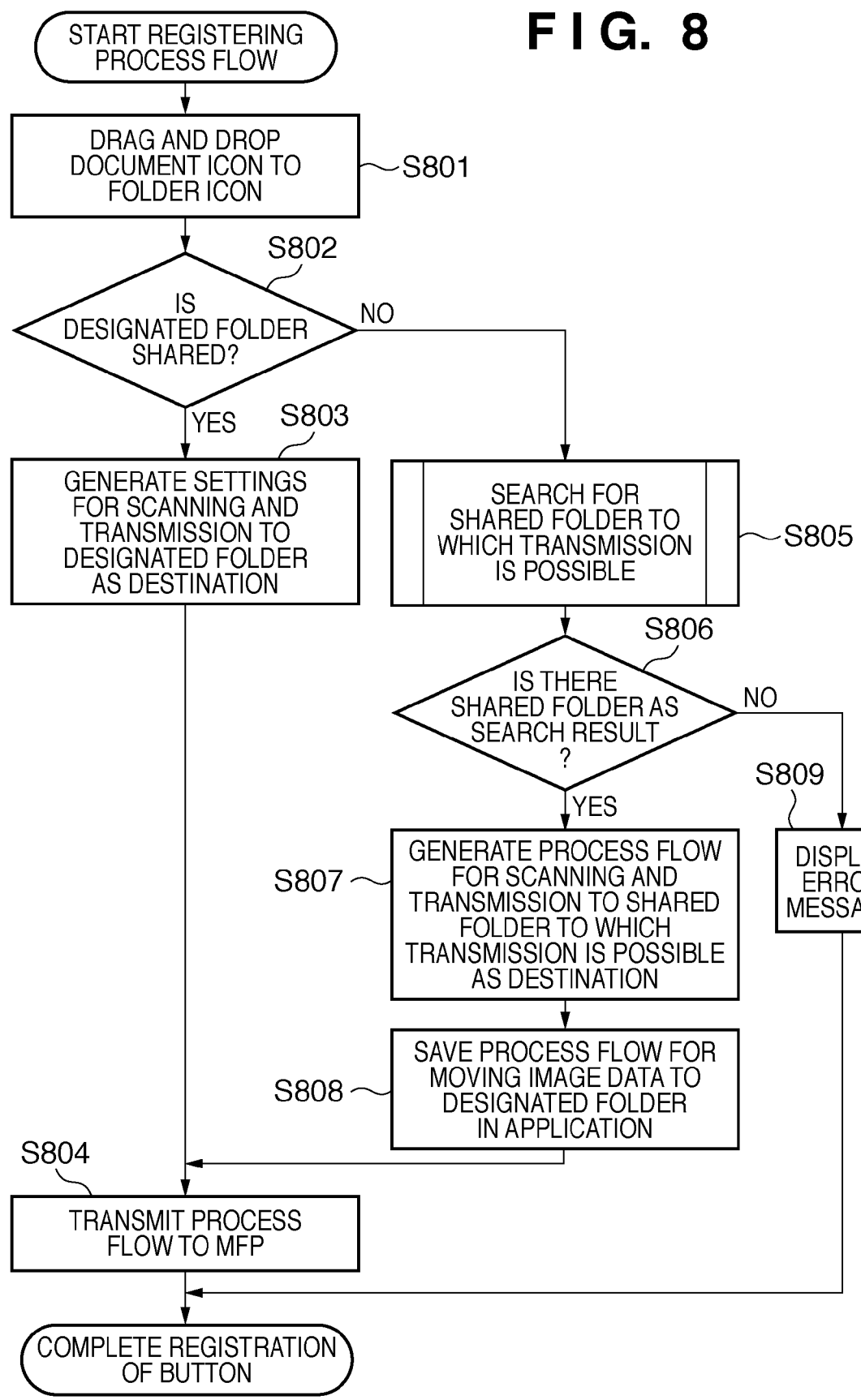
FIG. 8 is a diagram showing a procedure of processing for registering a process flow in this embodiment.

FIG. 8 is a flow chart showing a procedure of processing performed by the PC 100 until a process flow from the PC 100 is registered in the MFP 110 in this embodiment. A description is given with reference to FIGS. 7, 9A, and 9B, as well. A description is given below assuming that a folder that the MFP 110 can access is a shared folder.

In step S801, the UI unit 402 of the PC 100 detects that the user has dragged and dropped a device icon 604 or 605 displayed in the device display area 603 to a folder 606 displayed in the tree view area 601. The UI unit 402, which has detected this user operation, notifies the main control unit 401 of that operation, and the processing proceeds to step S802.

In step S802, the main control unit 401 determines whether or not the folder 606 has been set so as to be shared. When the folder 606 has been set so as to be shared, the processing proceeds to step S803. When the folder 606 is not set so as to be shared, the processing proceeds to step S805.

In step S803, the flow management unit 407 generates a process flow for settings for scanning and transmission to the folder 606 as a transmission destination, as indicated in the process flow file 700, in response to instructions from the main control unit 401, and the processing proceeds to step S804 (third generation).

In step S804, the communication unit 403 transmits the process flow generated in step S803 or step S807 to the MFP 110 in response to instructions from the main control unit 401. The instructions at this time from the main control unit 401 to the communication unit include an identifier such as an IP address that specifies the MFP 110. The identifier of the MFP 110 is an identifier that is obtained, from the device information storage unit 406, by the device management unit 405 in response to instructions issued by the main control unit 401 thereto. The communication unit 403 transmits a process flow to the MFP 110 using the identifier of the MFP 110.

On the other hand, when the folder 606 is not set so as to be shared in step S802, in step S805, the shared folder search unit 404 of the PC 100 searches for a shared folder in response to instructions from the main control unit 401, and the processing proceeds to step S806. Search processing is described later.

In step S806, the main control unit 401 determines whether there is a shared folder as a result of the search in step S805. If there is a shared folder, the processing proceeds to step S807. If there is no shared folder, the processing proceeds to step S809.

In step S807, the flow management unit 407 generates a process flow for scanning and transmitting to a shared folder found through the search in step S805 as a transmission destination, in response to instructions from the main control unit 401 (first generation).

The instructions from the main control unit 401 to the flow management unit 407 include an identifier such as an ID generated by the main control unit 401. The flow management unit 407 generates a process flow also including settings for using the identifier as the name of a scanned document.

For example, when a shared folder is found in the PC 130, a process flow file 900 shown in FIG. 9A is created. The path to the transmission destination folder set by a tag 901 is a path to the found shared folder in the PC 130. The filename indicated by a tag 902 is an ID issued by the main control unit 401. Although the above-mentioned identifier is set as the name of a scanned document in this embodiment, it is not necessary to set it as a name in particular, and it is sufficient if the client application 150 can obtain the identifier from a scanned document.

In step S808, in response to instructions from the main control unit 401, the flow management unit 407 generates a process flow including settings for moving the scanned document saved in the shared folder found in step S805 to the folder 606 (second generation). For example, similar to the example of step S807, when a shared folder is found in the PC 130, the flow management unit 407 generates a process flow file 950 shown in FIG. 9B.

A tag 951 indicates a task of moving a file. A tag 952 indicates the location to which the file is moved. The value of the tag 952 indicates that the file "ID_1" in the shared folder in the PC 130 is to be moved. The tag 952 indicates a destination to which the file is moved. A tag 953 indicates that the file is to be moved to the folder 606, which is a shared folder. A tag 954 indicates that a filename is to be changed when moving a file. The value of the tag 954 indicates that the filename is to be changed to the name "proceedings_20080321".

On the other hand, when a shared folder is not found through the search in step S806, the UI unit 402 displays, in step S809, a message dialog (not shown) for notifying the user that transmission to the folder 606 is impossible, in response to instructions from the main control unit 401.

Figure 10:
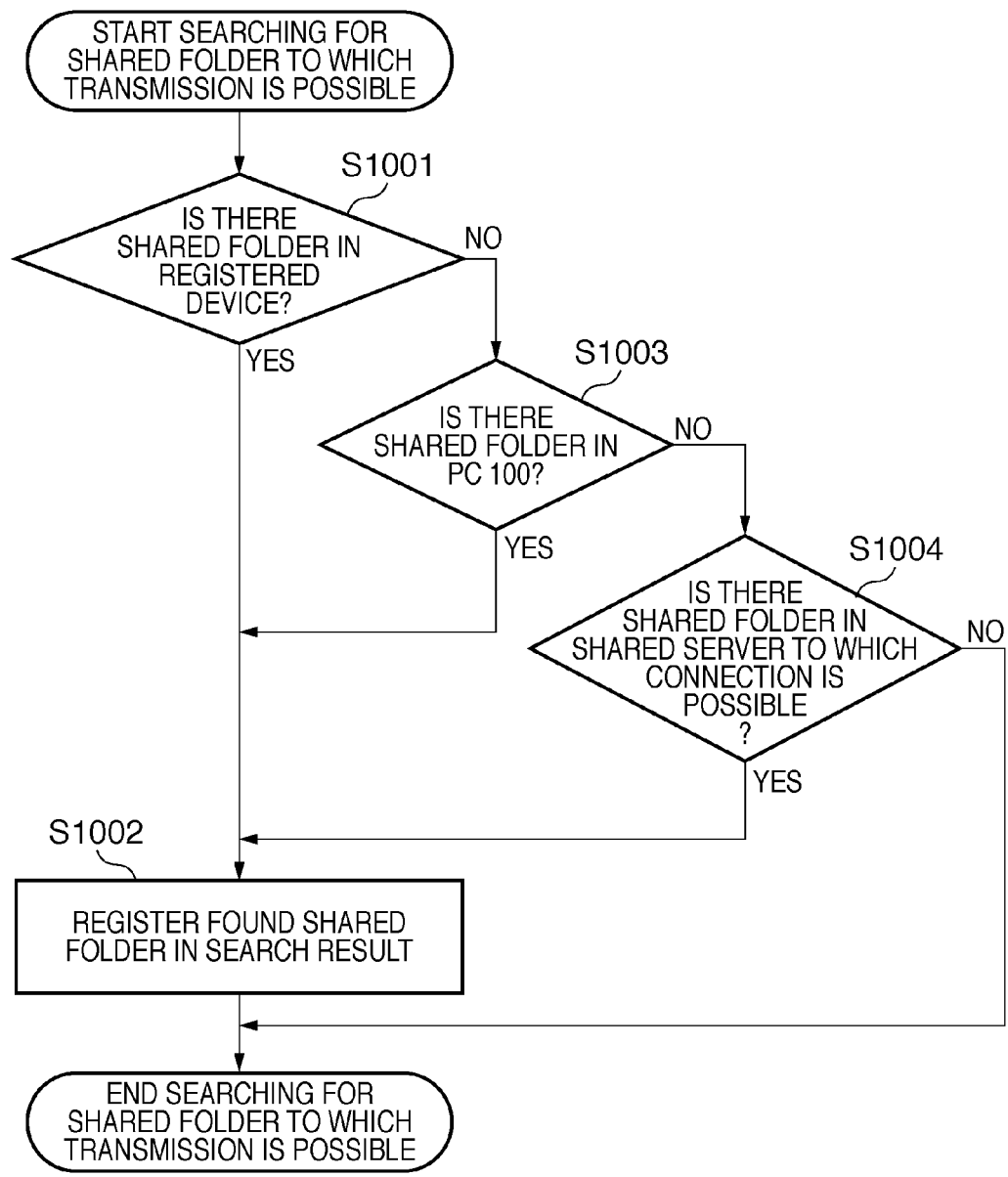
FIG. 10 is a diagram showing a procedure of processing for searching for a shared folder in step S805.

FIG. 10 is a flow chart showing a procedure of processing for searching for a shared folder in step S805. In step S1001, the shared folder search unit 404 searches whether there is a shared folder in a device registered in the client application 150.

At this time, the shared folder search unit 404 requests, from the device management unit 405, device information including an identifier such as an IP address that specifies a registered device. The shared folder search unit 404 searches for a shared folder using the identifier specifying a device received from the device management unit 405.

In the example shown in FIG. 6, the shared folder search unit 404 searches the MFP 110 and the MFP 120 for a shared folder. If a shared folder is found, the processing proceeds to step S1002. If a shared folder is not found, the processing proceeds to step S1003.

In step S1002, the shared folder search unit 404 notifies the main control unit 401 of the found shared folder.

In step S1003, the shared folder search unit 404 searches the PC 100 in which the client application 150 is installed for a folder that has been set so as to be shared. If a shared folder is found, the processing proceeds to step S1002. If a shared folder is not found, the processing proceeds to step S1004.

In step S1004, the shared folder search unit 404 searches for a shared folder on the network connected via the LAN 140. At this time, the shared folder search unit 404 first searches for a list of shared servers that are on the network and a logged-in user can access. Thereafter, the shared folder search unit 404 searches for a shared folder in a shared server on the list found through the search.

In the configuration shown in FIG. 1, for example, a shared server (not shown in FIG. 1) is found, and the shared folder search unit 404 searches for a shared folder in the shared server. If a shared folder is found, the processing proceeds to step S1002. If a shared folder is not found, the search for a shared folder to which transmission is possible ends.

Here, by preferentially searching an MFP registered in the client application 150 and assumed to be frequently used, it is easier to find a shared folder that a logged-in user can access. Further, by preferentially searching the PC 100 on which the client application 150 is installed, it is easier to find a shared folder that a logged-in user can access. For example, from MFPs and PCs that are connected to the LAN 140, the PC 100 is caused to periodically collect information regarding the number of each apparatus logged in and the like, so as to make a list indicating an access frequency. When searching, the PC 100 refers to the list and preferentially searches an MFP or a PC with a higher access frequency.

Figure 11:
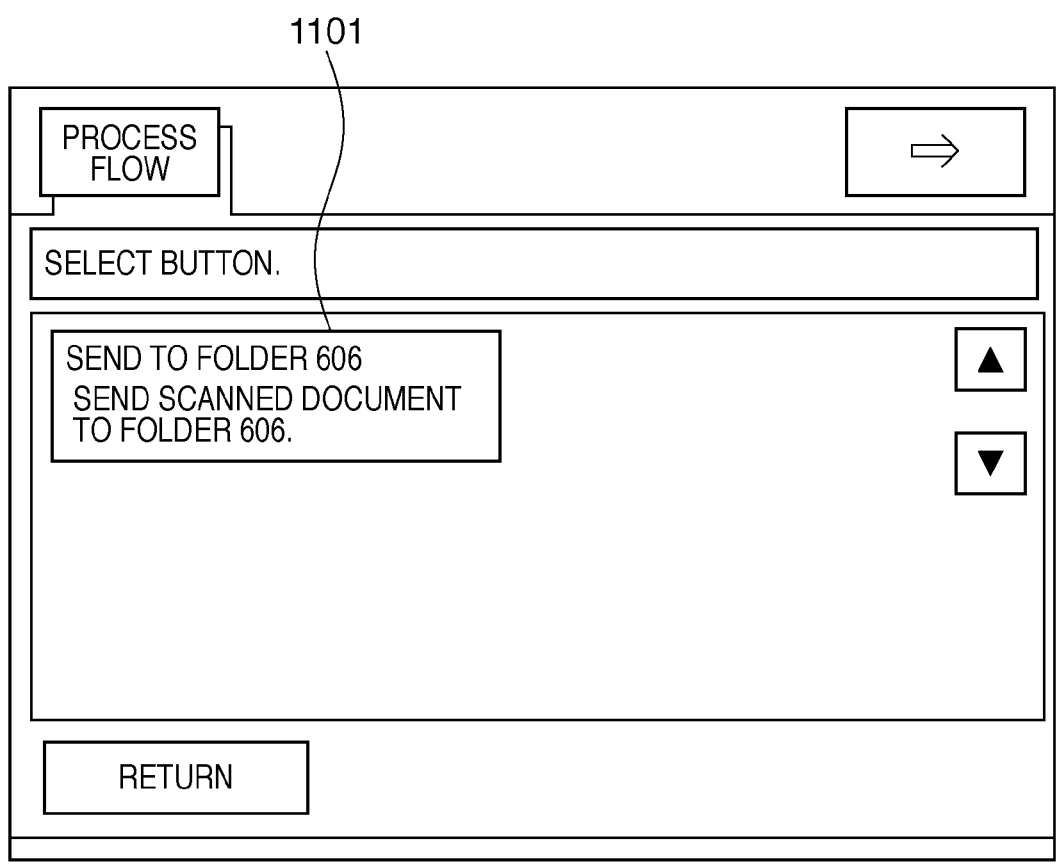
FIG. 11 is a diagram showing an example UI on the MFP.

FIG. 11 shows an example UI displayed on the operation unit 312 of the MFP 110 in this embodiment. FIG. 11 shows an UI of the MFP 110 that has been logged in. A description regarding an UI of a log-in screen is omitted. When information that a user inputted in the log-in screen is received, the UI unit passes the input information to the authentication unit 503. The authentication unit 503 determines whether there is authentication information that corresponds to the input information, and performs authentication. If the authentication is successful, the UI unit 501 displays a button only for the user specified by the authentication information on the UI.

A button 1101 is a button for scanning and transmission that the user has registered from the PC 100 via the client application 150. Pressing this button executes a scanning transmission with the MFP 110.

Figure 12:
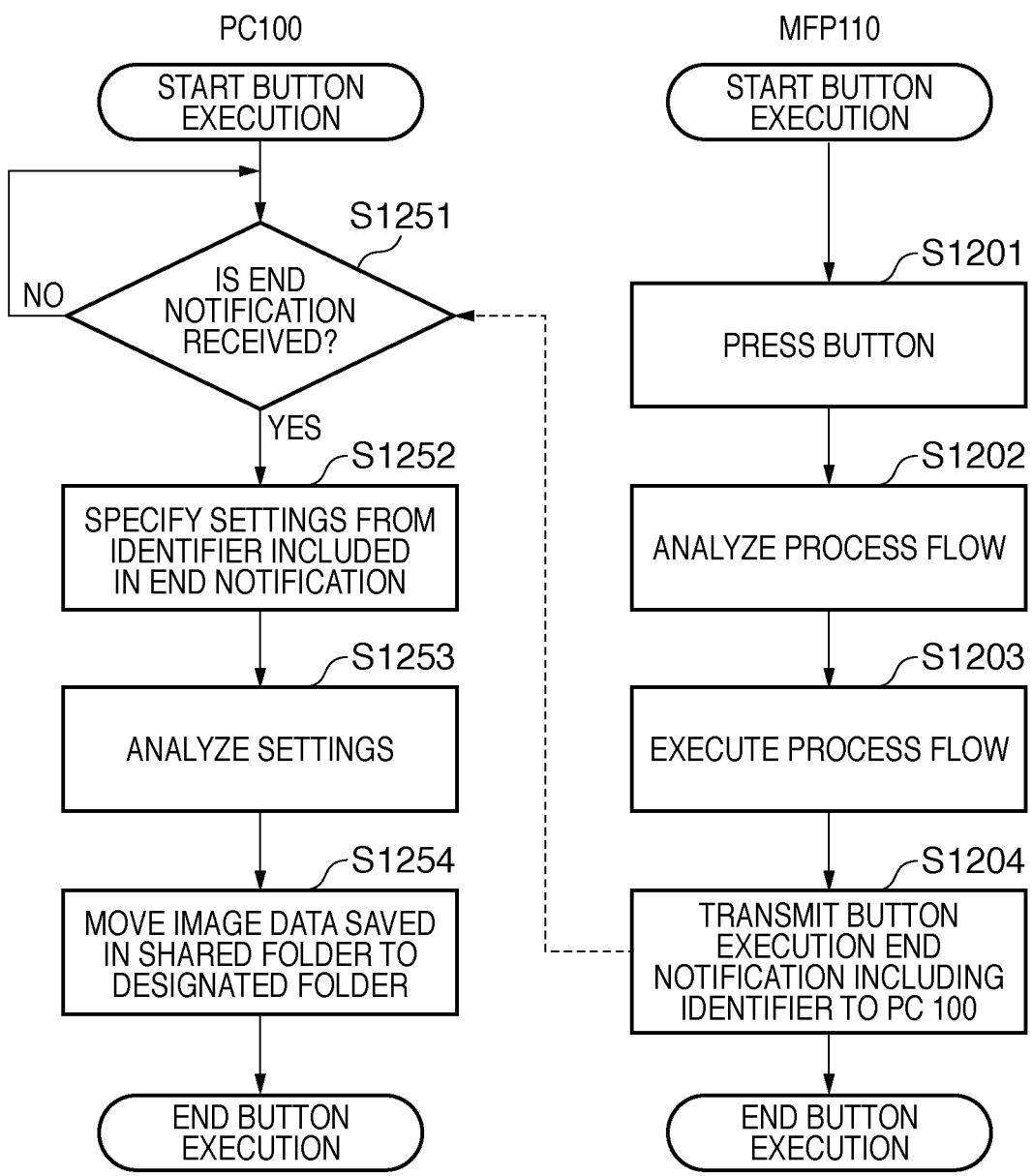
FIG. 12 is a diagram showing a procedure of processing when the process flow in the embodiment is executed.

FIG. 12 is a flow chart showing a procedure of processing when a process flow in this embodiment is executed. Steps S1201 to S1204 indicate a procedure of data processing performed by the MFP 110 when the process flow defined in the process flow file 900 is executed. Steps S1251 to S1254 constitute a flow chart showing a procedure of data processing performed by the PC 100 when the process flow defined in the process flow file 950 is executed. The process flows shown in FIG. 12 are executed when the user presses the button 1101 of the MFP 110.

In step S1201, the UI unit 501 of the MFP 110 detects that the user has pressed the button 1101 and notifies the flow analysis unit 506 of a process flow ID associated with the button 1101, and the processing proceeds to step S1202.

In step S1202, the flow analysis unit 506 of the MFP 110 analyzes the process flow file 900 associated with the process flow ID. At this time, the flow analysis unit 506 requests, from the flow management unit 507, a process flow file corresponding to the process flow ID. The flow management unit 507 reads out, from the flow storage unit 508, the process flow file 900 that corresponds to the process flow ID, and passes the file to the flow analysis unit 506.

The flow analysis unit 506 analyzes the process flow file 900 received from the flow management unit 507, and divides the file in task units. Further, the flow analysis unit 506 sequentially passes each task divided from the file to the task execution unit 509, and the processing proceeds to step S1203.

In step S1203, the task execution unit 509 executes the tasks passed from the flow analysis unit 506 in step S1202 in the order of a scanning task and a transmission task, and notifies the flow analysis unit 506 that execution has ended. Accordingly, scanned image data with the filename "ID_1" is transmitted to the shared folder of the PC 130.

In step S1204, the communication unit 502 of the MFP 110 notifies the PC 100 that the process flow has been executed in response to instructions from the flow analysis unit 506. At this time, the communication unit 502 transmits the process flow ID of the process that has been executed, as well. Although an execution process end notification including the process flow ID of the process that has been executed is transmitted in this embodiment, there is no limitation to a process flow ID in particular, and it is sufficient to include the name of a document that has been transmitted.

Steps S1251 to S1254 are steps in a flow chart showing a procedure of data processing performed by the PC 100 when a process flow defined in the process flow file 950 is executed. In step S1251, the communication unit 403 of the PC 100 monitors whether a process flow end notification is received. When a process flow end notification is not received, the communication unit 403 continues monitoring.

When a process flow end notification is received, the communication unit 403 notifies the main control unit 401 of a process flow ID included in the end notification, and the processing proceeds to step S1252. In this embodiment, although reception of a process flow end notification is monitored, it is of course also possible to monitor whether scanned image data is saved in a shared folder in the PC 130 serving as a transmission destination.

In step S1252, the flow execution unit 409 of the PC 100 analyzes the process flow file 950. At this time, the main control unit 401 instructs the flow management unit 407 to execute a process flow specified by a process flow ID included in the end notification.

In step S1253, the flow management unit 407 reads out, from the flow storage unit 408, the process flow file 950 specified by the process flow ID received from the main control unit 401. The flow management unit 407 instructs the flow execution unit 409 to execute a process flow defined in the process flow file 950 that has been read out. The flow execution unit 409 analyzes the process flow file 950, and the processing proceeds to step S1254.

In step S1254, the flow execution unit 409 of the PC 100 executes a moving task analyzed in step S1253. Thereby, the file with the name "ID_1" saved in the shared folder of the PC 130 is changed to the name "proceedings_20080321", and the file is moved to the folder 606 of the PC 100.

As described above, according to this embodiment, even when a transmission destination folder designated by the user is not set so as to be shared, it is possible to transmit scanned image data to the folder designated by the user.

As a result, in the file transmission processing using an image forming apparatus, when a transmission destination designated by the user cannot be accessed from the image forming apparatus, it is possible to prevent passing a process flow including the transmission destination to the image forming apparatus. Furthermore, a transmission destination that can be accessed from another image forming apparatus is automatically searched for, and a file is moved to the transmission destination designated by the user via that transmission destination, thereby increasing the convenience for the user. Furthermore, it is possible to prevent security from being compromised by inadvertently setting a transmission destination designated by the user so as to be shared, or the like.

Second Embodiment

Next, a second embodiment according to the present invention is described with reference to FIGS. 13 and 14. An image forming system in the second embodiment differs from the image forming system in the first embodiment in that a process flow to be registered in a device is not scanning transmission processing, but file transmission processing.

A file transmission processing function is a function for transmitting a file saved in an MFP to an information processing apparatus or the like connected via a network. The system configuration, the hardware configuration and software configuration of an MFP, the hardware configuration and software configuration of a PC are the same as those in the first embodiment. The procedure of data-processing for searching for a shared folder is also the same.

The following is a description of aspects in which a UI of the client application 150 and the procedure of data-processing performed by a PC when a process flow is registered differ. Regarding execution of the process flow, the task to be analyzed is merely changed to file transmission from scanning transmission; therefore, its further description is omitted.

Figure 13:
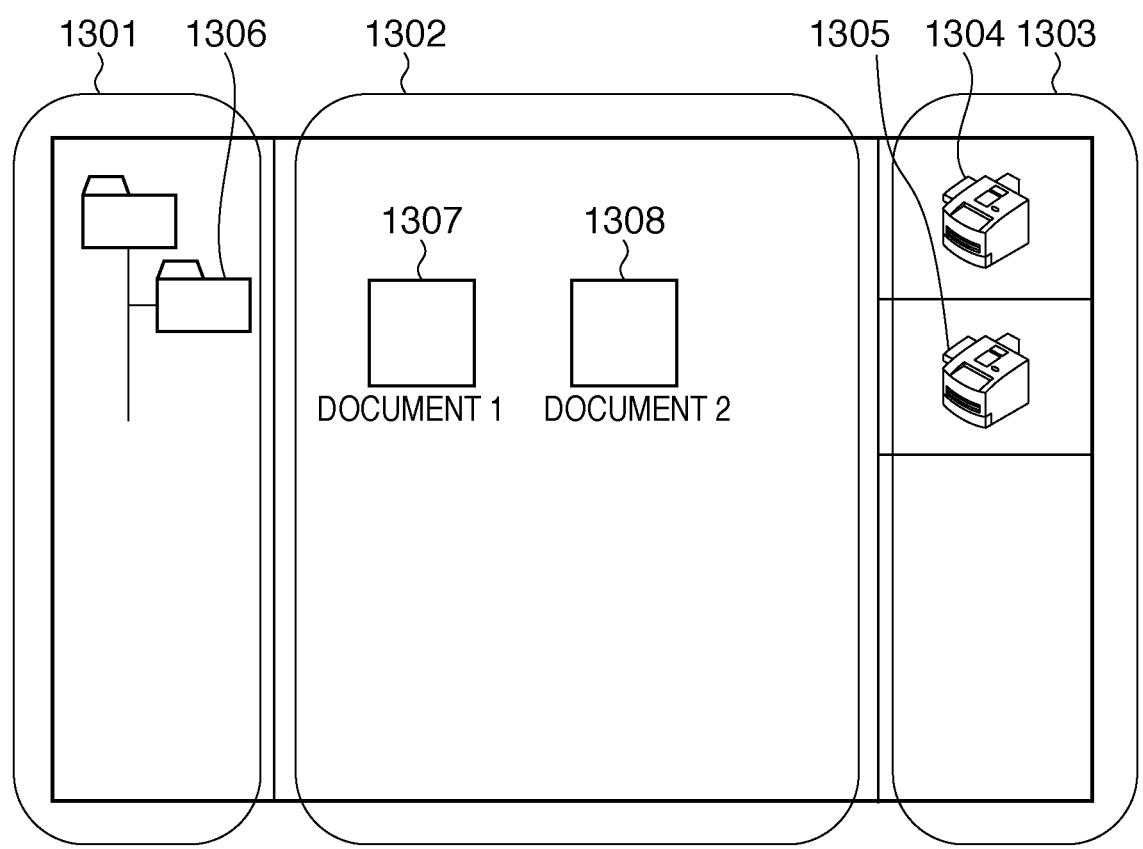
FIG. 13 is a diagram showing an example UI of a client application on a PC that constitutes an image forming system in a second embodiment.

FIG. 13 shows an example UI of the client application 150 according to the second embodiment. The UI shown in FIG. 13 is displayed by the UI unit 402 of the PC via the display unit interface 206. Constituent elements of the UI shown in FIG. 13 include a tree view area 1301 in which a folder and a directory are displayed as a tree structure, and a document display area 1302 in which an attribute, such as an icon or a filename of image data saved in a storage area of an MFP or the like, is displayed.

Furthermore, the constituent elements include a device display area 1303 in which icons of devices, such as an MFP and a scanner, are displayed. Devices (device icons 1304 and 1305) displayed in the device display area 1303 are registered in the client application 150, and information thereon is stored in the device information storage unit 406 of the PC.

For example, in FIG. 13, the MFP 110 and the MFP 120 are registered in the client application 150. A file saved in an MFP that is selected in the device display area 1303 is displayed in the document display area 1302.

In FIG. 13, document icons 1307 and 1308 are displayed in the document display area 1302, which indicates that files with the filenames "proceedings_20080321" and "proceedings_20080323" are saved in the MFP 110.

By performing an operation of dragging and dropping an icon displayed in the document display area 1302 to a folder in the tree view area 1301, it is possible to register, in a device, a process flow for transmitting a file to that folder as a destination. Consequently, it is possible to set a transmission destination and perform an operation of registering a process flow to an MFP at the same time. The user can create a process flow and can register the process flow in an MFP by operating the UI of the client application 150 shown in FIG. 13.

Figure 14:
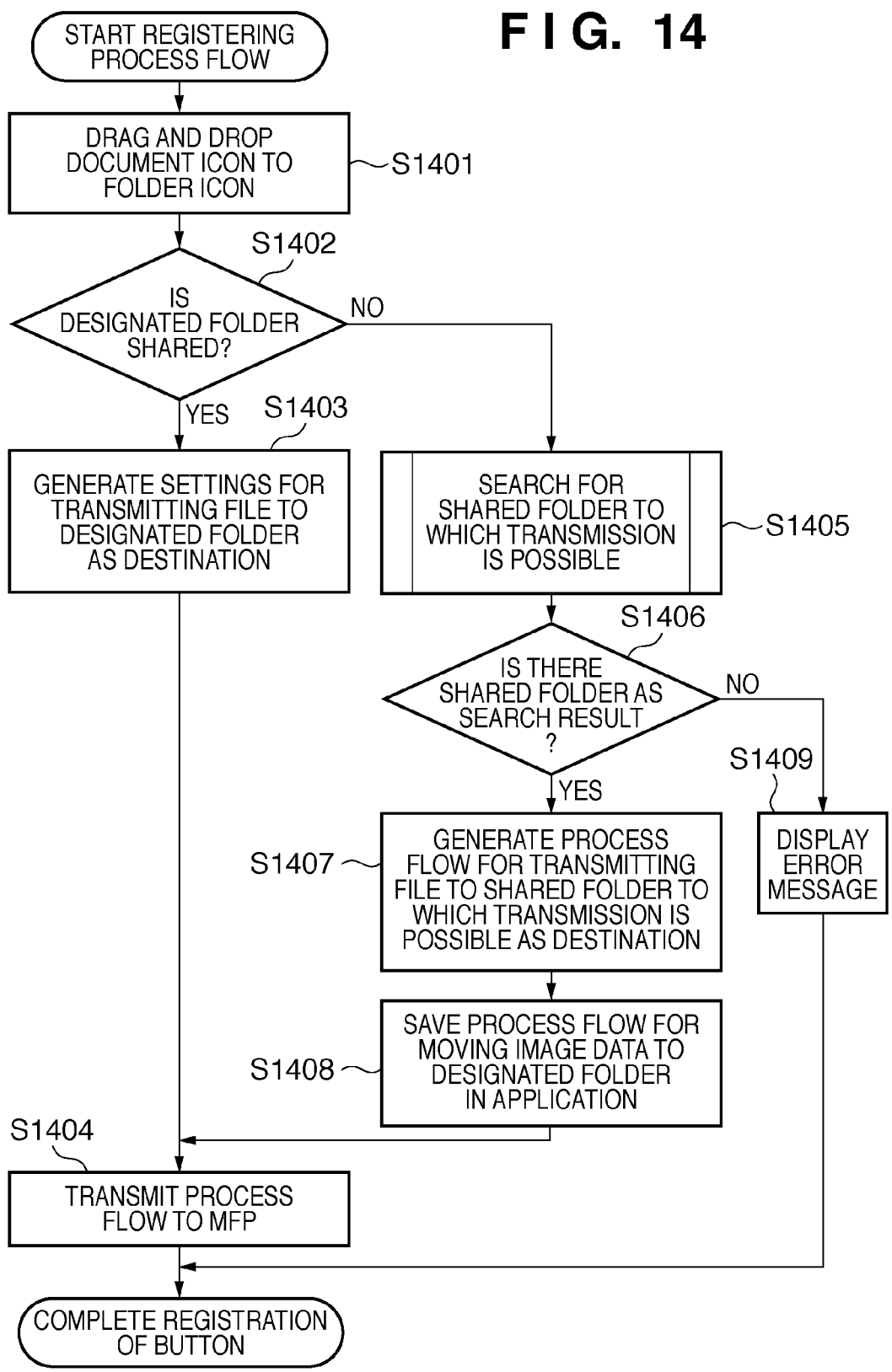
FIG. 14 is a diagram showing a procedure of processing for registering a process flow in this embodiment.

FIG. 14 is a flow chart showing a procedure of processing performed by the PC 100 when a process flow for file transmission in this embodiment is registered. A description is given with reference to FIGS. 7, 9A, and 9B, as well. In step S1401, the UI unit 402 of the PC 100 detects that the user has dragged and dropped the document icon 1307 displayed in the document display area 1302 to a folder 1306 displayed in the tree view area 1301. The UI unit 402 that has detected this user operation notifies the main control unit 401 of that operation, and the processing proceeds to step S1402.

In step S1402, the main control unit 401 determines whether the folder 1306 has been set so as to be shared. When the folder 1306 has been set so as to be shared, the processing proceeds to step S1403. When the folder 1306 is not set so as to be shared, the processing proceeds to step S1405.

In step S1403, the flow management unit 407 generates a process flow for settings for transmitting "document 1" to the folder 1306 as a transmission destination in response to instructions from the main control unit 401, and the processing proceeds to step S1404.

In step S1404, the communication unit 403 transmits the process flow generated in step S1403 or step S1407 to the MFP 110, in response to instructions from the main control unit 401. The instructions at this time from the main control unit 401 to the communication unit 403 include an identifier such as an IP address that specifies the MFP 110. The identifier of the MFP 110 is an identifier obtained, from the device information storage unit 406, by the device management unit 405 in response to instructions issued by the main control unit 401 thereto. The communication unit 403 transmits a process flow to the MFP 110 using the identifier of the MFP 110.

On the other hand, when the folder 1306 is not set so as to be shared in step S1402, the shared folder search unit 404 searches for a shared folder in step S1405 in response to instructions from the main control unit 401, and the processing proceeds to step S1406.

In step S1406, the main control unit 401 of the PC 100 determines whether there is a shared folder as a result of the search in step S1405. When there is a shared folder, the processing proceeds to step S1407. When there is no shared folder, the processing proceeds to step S1409.

In step S1407, the flow management unit 407 of the PC 100 generates a process flow for transmitting a file to the shared folder found through the search in step S1405 as a transmission destination, in response to instructions from the main control unit 401. The instructions from the main control unit 401 to the flow management unit 407 include an identifier such as an ID generated by the main control unit 401.

The flow management unit 407 generates a process flow that also includes settings for using an identifier as a name of the file. Although such an identifier is set as the name of a transmission document in this embodiment, the identifier does not necessarily have to be set as a name, and it is sufficient if the client application 150 can obtain the identifier.

In step S1408, the flow management unit 407 generates a process flow including settings for moving a file saved in the shared folder found in step S1405 to the folder 1306 of the PC 100, in response to instructions from the main control unit 401.

In step S1409, the UI unit 402 of the PC 100 displays a message dialog (not shown) notifying the user that the file cannot be transmitted to the folder 1306, in response to instructions from the main control unit 401.

As described above, according to this embodiment, even when the transmission destination folder designated by the user is not set so as to be shared, it is possible to transmit image data saved in an MFP to the folder designated by the user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-272351, filed Oct. 22, 2008, which is hereby incorporated by reference herein in its entirety.

What is claimed is:

1. An image forming system comprising an information processing apparatus and an image forming apparatus that are connected to each other via a network, wherein the information processing apparatus comprises:

a designation unit configured to designate a first transmission destination of file transmission processing to be executed by the image forming apparatus;

a determination unit configured to determine whether or not the first transmission destination of the file transmission processing can be accessed from the image forming apparatus;

a search unit configured to, in a case where the determination unit determines that the first transmission destination cannot be accessed from the image forming apparatus, search for a second transmission destination that the image forming apparatus can access via the network;

a first generation unit configured to generate a first process flow including file transmission processing in which the image forming apparatus transmits a file to the second transmission destination searched by the search unit, and transmit the generated first process flow to the image forming apparatus; and a second generation unit configured to generate a second process flow including processing for moving the file from the second transmission destination to the first transmission destination, and store the generated second process flow in the information processing apparatus; and a moving unit configured to move the file from the second transmission destination to the first transmission destination by executing the stored second process flow in a case where it is notified by the image forming apparatus that the first process flow has been executed, and wherein the image forming apparatus comprises:

an execution unit configured to transmit the file to the second transmission destination by executing the first process flow transmitted by the first generation unit of the information processing apparatus; and a notification unit configured to notify, in a case where the execution unit executes the first process flow, the information processing apparatus that the first process flow has been executed.

2. The image forming system according to claim 1, wherein the information processing apparatus further comprises a third generation unit configured to generate, in a case where the determination unit determines that the first transmission destination can be accessed from the image forming apparatus, a third process flow including file transmission processing in which the image forming apparatus transmits the file to the first transmission destination, and transmit the generated third process flow to the image forming apparatus.

3. The image forming system according to claim 1, wherein the search unit searches for the second transmission destination that can be accessed from the image forming apparatus, in order starting from an apparatus with a highest frequency of access by a user on the network.

4. The image forming system according to claim 1, wherein the designation unit includes a user interface, and designates the transmission destination of the file transmission processing in accordance with dragging and dropping of an icon displayed on the user interface.

5. An image forming method comprised by an image forming system to which an information processing apparatus and an image forming apparatus that are connected to each other via a network, the image forming method comprising:

a designation step in which the information processing apparatus designates a first transmission destination of file transmission processing to be executed by the image forming apparatus;

a determination step in which the information processing apparatus determines whether or not the first transmission destination of the file transmission processing can be accessed from the image forming apparatus;

a search step in which, in a case where the determination step is that the first transmission destination cannot be accessed from the image forming apparatus, the information processing apparatus searches for an apparatus that has a second transmission destination that the image forming apparatus can access via the network;

a first generation step in which the information processing apparatus generates a first process flow including file transmission processing in which the image forming apparatus transmits a file to the second transmission destination searched in the search step, and transmits the generated first process flow to the image forming apparatus;

a second generation step in which the information processing apparatus generates a second process flow including processing for moving the file from the second transmission destination to the first transmission destination, and stores the generated second process flow in the information processing apparatus; and a moving step that moves the file from the second transmission destination to the first transmission destination by executing the stored second process flow in a case where is notified by the image forming apparatus that the first process flow has been executed, an execution step in which the image forming apparatus transmits the file to the second transmission destination by executing the first process flow transmitted by the first generation step; and a notification step in which the image forming apparatus notifies, in a case where in the execution step executes the first process flow, the information processing apparatus that the first process flow has been executed.

6. A non-transitory computer-readable medium storing an image forming program, the image forming program being used in an information processing apparatus in an image forming system comprising the information processing apparatus and an image forming apparatus are connected to each other via a network, wherein the computer-readable medium causes a computer as the information processing apparatus to:

designate a first transmission destination of file transmission processing to be executed by the image forming apparatus, determine whether or not the first transmission destination of the file transmission processing can be accessed from the image forming apparatus, search for, in a case where it is determined that the first transmission destination cannot be accessed from the image forming apparatus, a second transmission destination that the image forming apparatus can access via the network, generate a first process flow including file transmission processing in which the image forming apparatus transmits a file to the second transmission destination searched for in the search, and transmits the generated first process flow to the image forming apparatus, generate a second process flow including processing for moving the file from the second transmission destination to the first transmission destination, and stores the generated second process flow in the information processing apparatus, move the file from the second transmission destination to the first transmission destination by executing the stored second process flow in a case where it is notified by the image forming apparatus that the first process flow has been executed, and transmit the file to the second transmission destination by executing the first process flow.

7. An information processing apparatus used in an image forming system to which the information processing apparatus and an image forming apparatus that are connected to each other via a network, the information processing apparatus comprising:

a designation unit configured to designate a first transmission destination of file transmission processing to be executed by the image forming apparatus;

a determination unit configured to determine whether or not the first transmission destination of the file transmission processing can be accessed from the image forming apparatus;

a search unit configured to, in a case where the determination unit determines that the first transmission destination cannot be accessed from the image forming apparatus, search for an apparatus that has a second transmission destination that the image forming apparatus can access via the network;

a first generation unit configured to generate a first process flow including file transmission processing in which the image forming apparatus transmits a file to the second transmission destination searched by the search unit, and transmit the generated first process flow to the image forming apparatus;

a second generation unit configured to generate a second process flow including processing for moving the file from the second transmission destination to the first transmission destination, and store the second process flow in the information processing apparatus; and a moving unit configured to move the file from the second transmission destination to the first transmission destination by executing the second process flow in a case where it is notified that the first process flow has been executed.

* * * * *